United States Patent
Virolainen et al.

(10) Patent No.: US 8,914,007 B2
(45) Date of Patent: Dec. 16, 2014

(54) METHOD AND APPARATUS FOR VOICE CONFERENCING

(71) Applicant: Nokia Corporation, Espoo (FI)

(72) Inventors: Jussi Virolainen, Espoo (FI); Ville Myllyla, Tampere (FI)

(73) Assignee: Nokia Corporation, Espoo (FI)

( * ) Notice: Subject to any disclaimer, the term of this patent is extended or adjusted under 35 U.S.C. 154(b) by 77 days.

(21) Appl. No.: 13/779,223

(22) Filed: Feb. 27, 2013

(65) Prior Publication Data

US 2014/0242959 A1    Aug. 28, 2014

(51) Int. Cl.
| | |
|---|---|
| H04M 3/42 | (2006.01) |
| H04W 28/04 | (2009.01) |
| H04W 4/16 | (2009.01) |
| H04M 3/56 | (2006.01) |
| H04L 29/06 | (2006.01) |

(52) U.S. Cl.
CPC ............. *H04W 28/048* (2013.01); *H04W 4/16* (2013.01); *H04M 3/567* (2013.01); *H04L 29/06414* (2013.01); *H04M 3/568* (2013.01)
USPC .. 455/416; 455/418; 379/202.01; 379/209.01

(58) Field of Classification Search
CPC ..... H04M 3/568; H04M 3/567; H04M 3/562; H04L 29/06414; H04L 29/06421; H04L 29/06428; H04L 29/08657; H04L 65/403; H04L 65/4038; H04L 65/4036
USPC ................. 455/416, 418; 379/202.01, 209.01
See application file for complete search history.

(56) References Cited

U.S. PATENT DOCUMENTS

| | | | |
|---|---|---|---|
| 6,408,327 B1 * | 6/2002 | McClennon et al. | 709/204 |
| 6,430,535 B1 * | 8/2002 | Spille et al. | 704/500 |

(Continued)

FOREIGN PATENT DOCUMENTS

| | | |
|---|---|---|
| EP | 2 444 967 | 4/2012 |
| WO | WO 2007/003683 A1 | 1/2007 |
| WO | WO 2013/093172 A1 | 6/2013 |

OTHER PUBLICATIONS

Yensen, T. et all., *An Acoustic Echo Cancellation Structure for Synthetic Surround Sound*, ICASSP '01 Proceedings of the Acoustics, Speech, and Signal Processing, 2001 on IEEE International Conference—vol. 5, pp. 3237-3240 (ISBN:0-7803-7041-4 doi>10.1109/ICASSP.2001.940348) 4 pages.

(Continued)

*Primary Examiner* — Khai M Nguyen
(74) *Attorney, Agent, or Firm* — Alston & Bird LLP

(57) ABSTRACT

A method, apparatus computer program product provide acoustical echo control for distributed voice conferencing including distributed voice conferencing that utilizes spatial audio processing. In the context of a method, a reference signal and one or more other reference signals may be received by a mobile terminal. The reference signal is associated with downlink audio to be reproduced by the mobile terminal and the one or more other reference signals are associated with downlink audio to be reproduced by one or more other mobile terminals. The method also includes processing an echo signal from uplink audio due to the downlink audio reproduced by the audio transducer of the mobile terminal based upon the reference signal. The method also processes an echo signal from uplink audio due to the downlink audio reproduced by respective audio transducers of the one or more other mobile terminals based upon the one or more other reference signals.

24 Claims, 7 Drawing Sheets

(56) References Cited

U.S. PATENT DOCUMENTS

| | | |
|---|---|---|
| 7,973,857 B2 | 7/2011 | Ahmaniemi et al. |
| 8,218,460 B2 | 7/2012 | Laaksonen et al. |
| 8,238,548 B2 * | 8/2012 | Frauenthal et al. ...... 379/406.16 |
| 2006/0182268 A1 | 8/2006 | Marton |
| 2007/0067158 A1 | 3/2007 | Blocher |
| 2007/0189507 A1 * | 8/2007 | Tittle et al. ............... 379/406.01 |
| 2008/0159507 A1 | 7/2008 | Virolainen et al. |
| 2008/0160976 A1 * | 7/2008 | Virolainen et al. ........... 455/416 |
| 2009/0264114 A1 * | 10/2009 | Virolainen et al. ........... 455/416 |
| 2010/0020955 A1 * | 1/2010 | Wengrovitz ............. 379/202.01 |
| 2012/0076308 A1 | 3/2012 | Kuech et al. |
| 2012/0170760 A1 * | 7/2012 | Virolainen et al. ............. 381/56 |

OTHER PUBLICATIONS

Zhang, Z. et al., *Multicahnnel Acoustic Echo Cancelation in Multiparty Spatial Audio Conference With Constrained Kalman Filtering*, in Proc. International Workshop on Acoustic Ech and Noise Control (IWAENC'08), Seattle Washington, Sep. 2008, 4 pages.

Hansler et al., *Acoustic Echo and Noise Control A Pratical Approach*, Wiley 2004 (entire book).

\* cited by examiner

METHOD AND APPARATUS FOR VOICE CONFERENCING

TECHNOLOGICAL FIELD

An example embodiment of the present invention relates generally to distributed voice conferencing and, more particularly, to acoustic echo control in conjunction with distributed voice conferencing.

BACKGROUND

As shown in FIG. 1, distributed voice conferencing, also known as distributed teleconferencing, allows a number of people in the same acoustical space, such as a number of people within the same conference room, to participate in a teleconference with each person utilizing the microphone and loudspeaker of their own mobile terminal 10 to transmit and receive audio signals during the teleconference. In order to establish a distributed voice conference, a wireless network may be established between the mobile terminals that are resident within the same acoustical space.

As shown at Location A of FIG. 2, one of the mobile terminals may serve as a host device 12 and, as such, communicates with the other mobile terminals 10 within the same acoustical space. Based upon audio signals received by the microphones of the mobile terminals and provided to the host device, an enhanced uplink signal may be generated by the host device utilizing a mixing algorithm. The enhanced uplink signal may then be provided to a central conference server 14, such as a conference bridge, and/or to another remotely located mobile terminal. In the downlink direction, the host device may receive an audio signal from the network, such as from the central conference server, and may then share the audio signal with the other mobile terminals within the acoustic space. The audio signal may then be reproduced by the respective loudspeakers of the mobile terminals within the acoustic space.

As shown at location C of FIG. 2, the central conference server, such as a conference bridge, may facilitate distributed conferencing functionality by serving as a host device for the mobile terminals at Location C. In this regard, the mobile terminals at location C may contact the central conference server and the mobile terminals at location C maybe determined to be within the same acoustical space. In this regard, the central conference server may automatically detect that the mobile terminals are within the same acoustical space. Alternatively, the mobile terminals may provide an indication, such as via dual-tone multi-frequency (DTMF) signaling, indicative of the mobile terminals being within the same acoustical space.

Distributed conferencing may provide improved speech quality on the far end since the microphones of the mobile terminals are located near the participants. Additionally, at the near end, less listening effort may be required since multiple loudspeakers may be utilized to reproduce the audio. In this regard, the use of several loudspeakers may reduce distortion levels since the loudspeaker output may be maintained at a relatively low level compared to the level that must be maintained in an instance in which a single loudspeaker is utilized for a conference room. Distributed conference audio also allows a determination to be made as to who is currently speaking in the conference room.

The audio signals generated by the loudspeaker may be picked up or received by the microphone of a mobile terminal and perceived as an undesirable echo at the far end. This phenomenon is referred to as acoustic echo as a result of the acoustic coupling between the transducers. Acoustic echo control (AEC) has been developed in order to attenuate the acoustic coupling between the audio signals reproduced by the loudspeaker and the audio signals received by the microphone of the same device. AEC generally utilizes an adaptive filter positioned between the downlink and uplink signals followed by a residual echo suppression unit. In order to attenuate the echo, the AEC must have knowledge of or access to the downlink signal that causes the echo when reproduced by the loudspeaker. In distributed voice conferencing, each mobile terminal may include AEC in order to attenuate the echo created by the acoustic coupling between the audio signals generated by the loudspeaker and the audio signals received by the microphone of the same device so as to provide an acceptable communication experience for the participants.

Distributed voice conference systems have been developed that utilize spatial audio processing and multi-channel audio reproduction; instead of monophonic downlink reproduction. Spatial sound may improve speech intelligibility and speaker identification by providing spatial cues for the listener in order to segregate the remote speakers more easily. The spatial cues may be created utilizing time and amplitude panning with digital filtering prior to reproduction.

In regards to spatial audio processing, each mobile terminal of a distributed group drives its loudspeaker to reproduce a different downlink signal. One example is illustrated in FIG. 3. In this example, the speech signal originating with mobile terminal A is reproduced only by the loudspeaker of mobile terminal B. As such, while the user of mobile terminal A is speaking, the audio signals may be reproduced by the loudspeaker of mobile terminal B and the acoustic echo control of mobile terminal B may cancel the acoustic echo received by its own microphone. However, the microphone of mobile terminal C also captures the audio signal reproduced by the loudspeaker of mobile terminal B. As mobile terminal C did not reproduce the audio signal, mobile terminal C does not attenuate the echo and, instead, causes the echo to be mixed with the uplink signal that is transmitted to mobile terminal A such that the user of mobile terminal A hears an echo. Similarly, audio signals provided by mobile terminal B may be reproduced by the loudspeaker of mobile terminal C. The echo received by the microphone of mobile terminal C may be cancelled, such as by acoustic echo cancellation provided by mobile terminal C, but the same audio signals may also be received by the microphone of mobile terminal B. Since the audio signals did not originate from the loudspeaker of mobile terminal B, mobile terminal B may treat the received audio signals as the product of a local sound source and mix these audio signals with the uplink signal that is transmitted to mobile terminals A and D so that the user of mobile terminal D experiences an echo.

BRIEF SUMMARY

A method, apparatus computer program product are provided according to an example embodiment in order to provide acoustical echo control for distributed voice conferencing including distributed voice conferencing that utilizes spatial audio processing. As such, the method, apparatus and computer program product of an example embodiment may leverage the improved speech intelligibility and speaker identification that is provided as a result of the spatial audio processing, but may also reduce or eliminate acoustic echo signals from other devices in the same acoustical space that might otherwise limit the usefulness of such spatial audio processing.

In one embodiment, a method for a voice communication system is provided that includes receiving, at a mobile terminal, a reference signal associated with downlink audio to be reproduced by an audio transducer of the mobile terminal and one or more other reference signals associated with downlink audio to be reproduced by respective audio transducers of one or more other mobile terminals. The method of this embodiment may also include processing, with a processor, an echo signal from uplink audio due to the downlink audio reproduced by the audio transducer of the mobile terminal based upon the reference signal. In this embodiment, the method also processes an echo signal from uplink audio due to the downlink audio reproduced by the respective audio transducers of the one or more other mobile terminals based upon the one or more other reference signals so as to at least partially attenuate echo signals from the uplink audio due to the downlink audio reproduced by the respective audio transducers of the one or more other mobile terminals.

In another embodiment, an apparatus for a voice communication system is provided that includes at least one processor and at least one memory including computer program code with the at least one memory and the computer program code configured to, with the processor, cause the apparatus to at least receive, at a mobile terminal, a reference signal associated with downlink audio to be reproduced by an audio transducer of the mobile terminal and one or more other reference signals associated with downlink audio to be reproduced by respective audio transducers of one or more other mobile terminals. In one embodiment, the at least one memory and the computer program code are configured to, with the processor, cause the apparatus to process an echo signal from uplink audio due to the downlink audio reproduced by the audio transducer of the mobile terminal based upon the reference signal. The at least one memory and the computer program code may also be configured to, with the processor, cause the apparatus to process an echo signal from uplink audio due to the downlink audio reproduced by the respective audio transducers of the one or more other mobile terminals based upon the one or more other reference signals so as to at least partially attenuate echo signals from the uplink audio due to the downlink audio reproduced by the respective audio transducers of the one or more other mobile terminals.

In a further embodiment, a computer program product for a voice communication system is provided that includes at least one non-transitory computer-readable storage medium having computer-executable program code portions stored therein with the computer-executable program code portions including program code instructions for receiving, at a mobile terminal, a reference signal associated with downlink audio to be reproduced by an audio transducer of the mobile terminal and one or more other reference signals associated with downlink audio to be reproduced by respective audio transducers of one or more other mobile terminals. The computer-executable program code portions may also include program code instructions for processing an echo signal from uplink audio due to the downlink audio generated by the audio transducer of the mobile terminal based upon the reference signal. Additionally, the computer-executable program code portions may include program code instructions for processing an echo signal from uplink audio due to the downlink audio reproduced by the respective audio transducers of the one or more other mobile terminals based upon the one or more other reference signals so as to at least partially attenuate echo signals from the uplink audio due to the downlink audio reproduced by the respective audio transducers of the one or more other mobile terminals.

In yet another embodiment, an apparatus for a voice communication system is provided by that includes means for receiving, at a mobile terminal, a reference signal associated with downlink audio to be reproduced by the mobile terminal and one or more other reference signals associated with downlink audio to be reproduced by respective audio transducers of one or more other mobile terminals. The apparatus of this embodiment may also include means for processing an echo signal from uplink audio due to the downlink audio reproduced by the audio transducer of the mobile terminal based upon the reference signal. In this embodiment, the apparatus also includes means for processing an echo signal from uplink audio due to the downlink audio reproduced by the respective audio transducers of the one or more other mobile terminals based upon the one or more other reference signals so as to at least partially attenuate echo signals from the uplink audio due to the downlink audio reproduced by the respective audio transducers of the one or more other mobile terminals.

In the foregoing methods, apparatus and computer program products, the one or more other reference signals may include a single reference signal associated with the downlink audio to be reproduced by the audio transducers of each of the other mobile terminals. In another embodiment, the one or more other reference signals may include at least one first reference signal associated with the downlink audio to be reproduced by the audio transducer of a respective one of the other mobile terminals. The one or more other reference signals of this embodiment may also include a second reference signal associated with the downlink audio to be reproduced by the audio transducers of a plurality of the other mobile terminals. In one embodiment, the one or more other reference signals may include a plurality of other reference signals with each other reference signal associated with the downlink audio to be reproduced by the audio transducer of a respective one of the other mobile terminals.

In one embodiment, a method for a voice communication system is provided that includes generating, with a processor, downlink audio signals to be provided to a plurality of mobile terminals in conjunction with distributed voice conferencing. The method of this embodiment also causes a reference signal and one or more other reference signals to be provided to a respective mobile terminal with the reference signal associated with the downlink audio signals provided to the respective mobile terminal and the one or more other reference signals associated with the downlink audio signals provided to one or more other mobile terminals to permit acoustic echo control of uplink audio due to downlink audio reproduced by respective audio transducers of the one or more other mobile terminals. The method of one embodiment may also include decorrelating the downlink audio signal to be provided to the respective mobile terminal from the downlink audio signals to be provided to the other mobile terminals.

In another embodiment, an apparatus for a voice communication system is provided that includes at least one processor and at least one memory including computer program code with the at least one memory and the computer program code configured to, with the processor, cause the apparatus to at least generate downlink audio signals to be provided to a plurality of mobile terminals in conjunction with distributed voice conferencing. In one embodiment, the at least one memory and the computer program code are configured to, with the processor, cause the apparatus to cause a reference signal and one or more other reference signals to be provided to a respective mobile terminal with the reference signal associated with the downlink audio signals provided to the respective mobile terminal and the one or more other reference signals associated with the downlink audio signals provided to one or more other mobile terminals to permit acoustic echo control of uplink audio due to downlink audio reproduced by respective audio transducers of the one or more other mobile terminals. The at least one memory and the computer program code may also be configured to, with the processor, cause the apparatus to decorrelate the downlink audio signal to be provided to the respective mobile terminal from the downlink audio signals to be provided to the other mobile terminals.

In a further embodiment, a computer program product for a voice communication system is provided that includes at least one non-transitory computer-readable storage medium having computer-executable program code portions stored therein with the computer-executable program code portions including program code instructions for generating downlink audio signals to be provided to a plurality of mobile terminals in conjunction with distributed voice conferencing. The computer-executable program code portions may also include program code instructions for causing a reference signal and one or more other reference signals to be provided to a respective mobile terminal with the reference signal associated with the downlink audio signals provided to the respective mobile terminal and the one or more other reference signals associated with the downlink audio signals provided to one or more other mobile terminals to permit acoustic echo control of uplink audio due to downlink audio reproduced by respective audio transducers of the one or more other mobile terminals. Additionally, the computer-executable program code portions may include program code instructions for decorrelating the downlink audio signal to be provided to the respective mobile terminal from the downlink audio signals to be provided to the other mobile terminals.

In yet another embodiment, an apparatus for a voice communication system is provided that includes means for generating downlink signals to be provided to a plurality of mobile terminals in conjunction with distributed voice conferencing. The apparatus of this embodiment also includes means for causing a reference signal and one or more other reference signals to be provided to a respective mobile terminal with the reference signal associated with the downlink audio signals provided to the respective mobile terminal and the one or more other reference signals associated with the downlink audio signals provided to one or more other mobile terminals to permit acoustic echo control of uplink audio due to downlink audio reproduced by respective audio transducers of the one or more other mobile terminals. The apparatus of one embodiment may also include means for decorrelating the downlink audio signal to be provided to the respective mobile terminal from the downlink audio signals to be provided to the other mobile terminals.

In the foregoing methods, apparatus and computer program products, the one or more other reference signals may include at least one first reference signal associated with the downlink audio signals provided to a respective one of the other mobile terminals. The one or more other reference signals of this embodiment may also include a second reference signal associated with the downlink audio signals provided to a plurality of the other mobile terminals. In one embodiment, the one or more other reference signals may include a plurality of other reference signals with each other reference signal associated with the downlink audio signals provided to a respective one of the other mobile terminals.

BRIEF DESCRIPTION OF THE DRAWINGS

Figure 1:
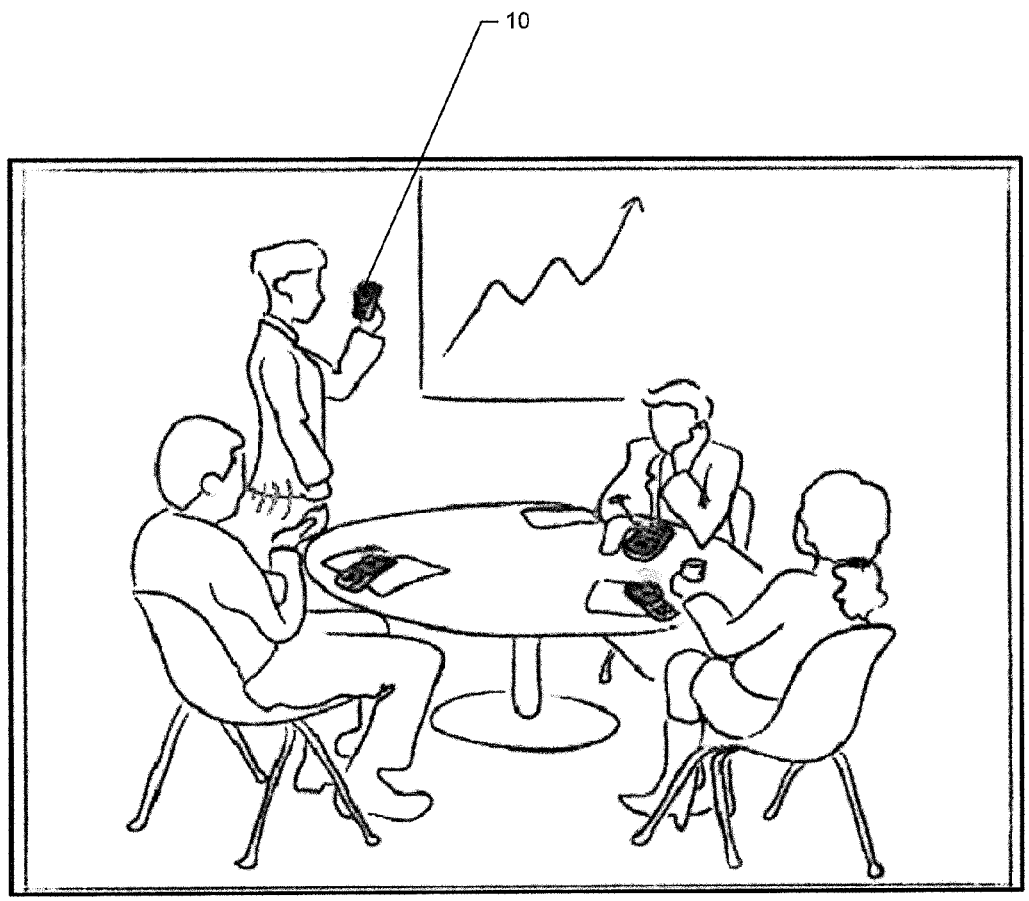
Figure 2:
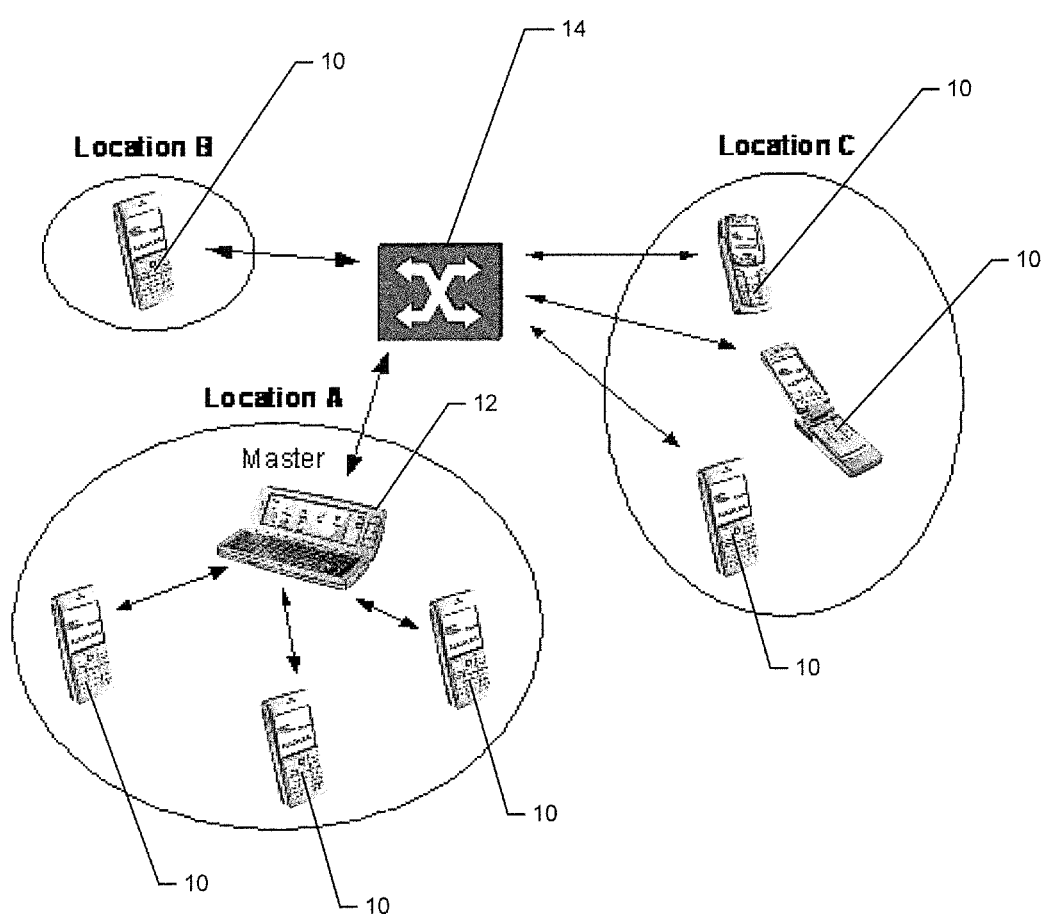
Figure 3:
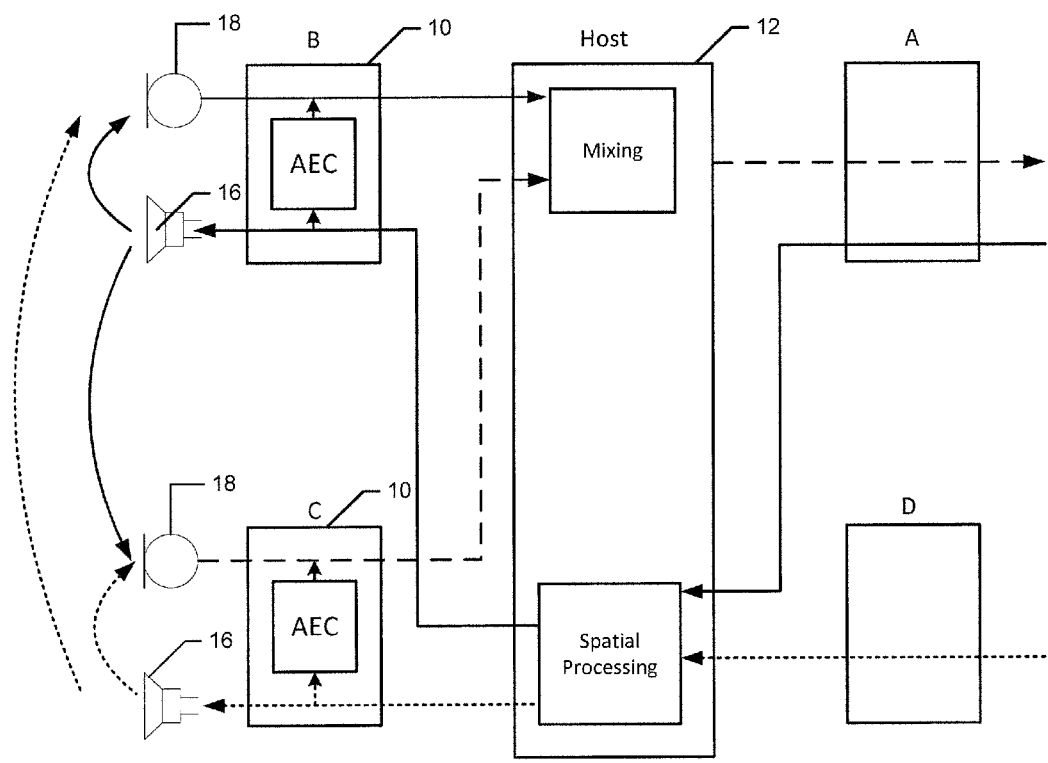
Figure 4:
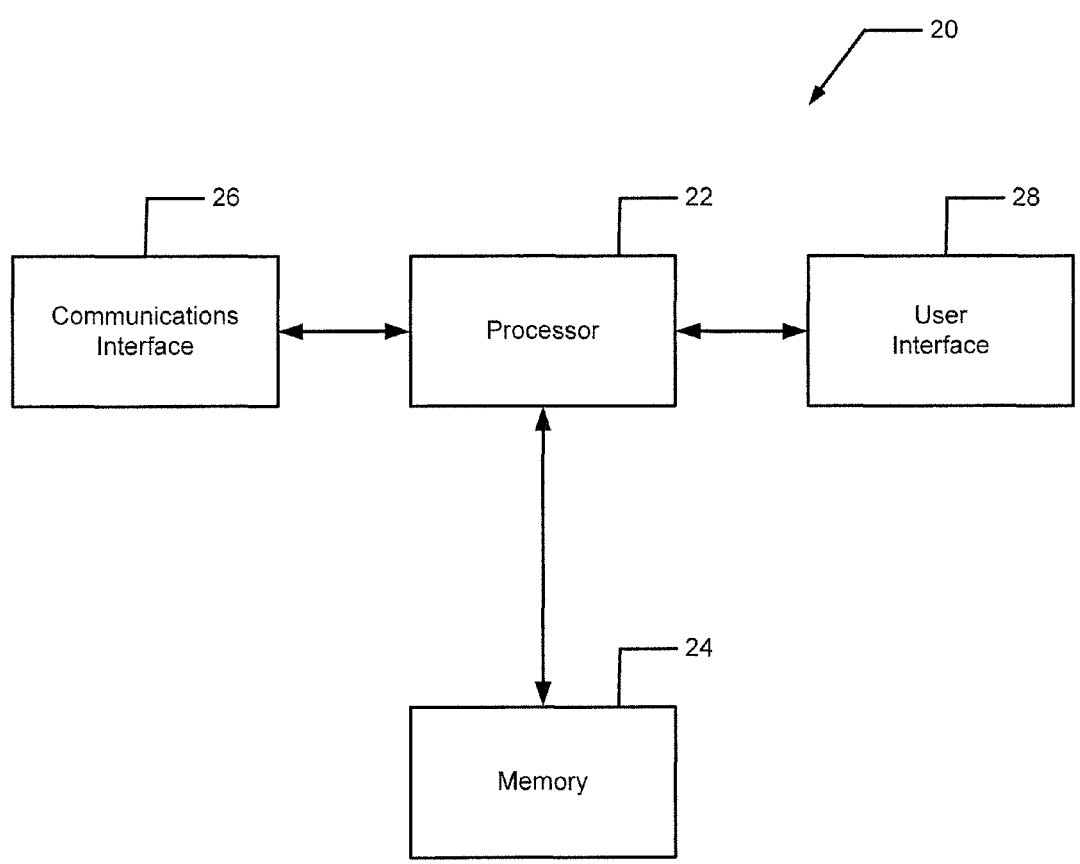
Figure 5:
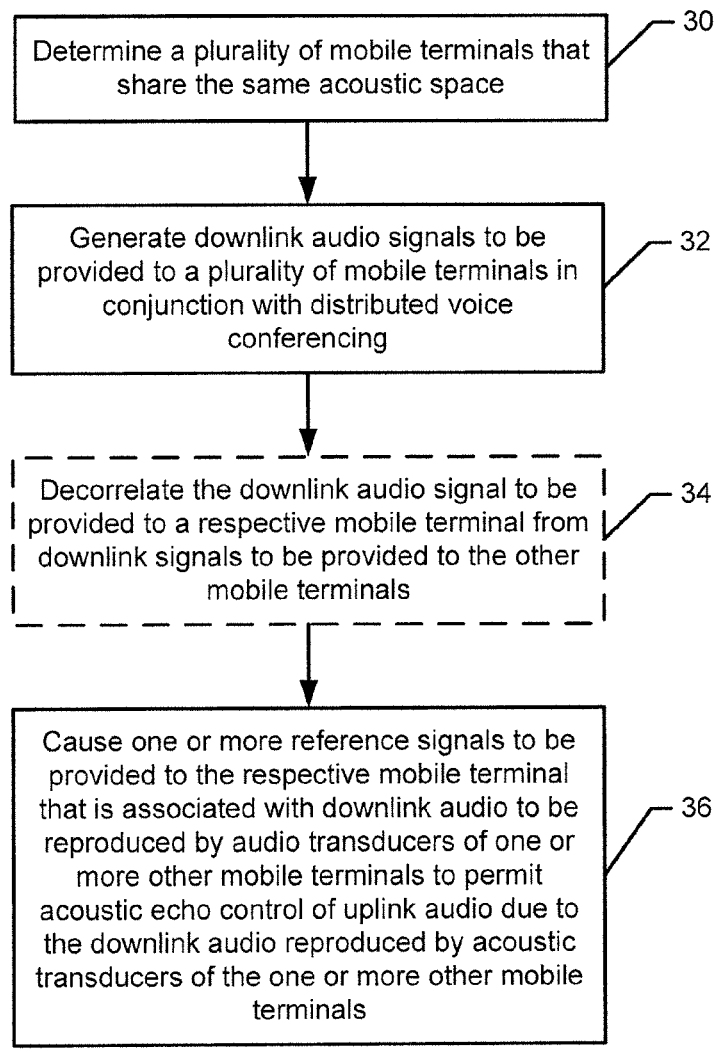
Figure 6:
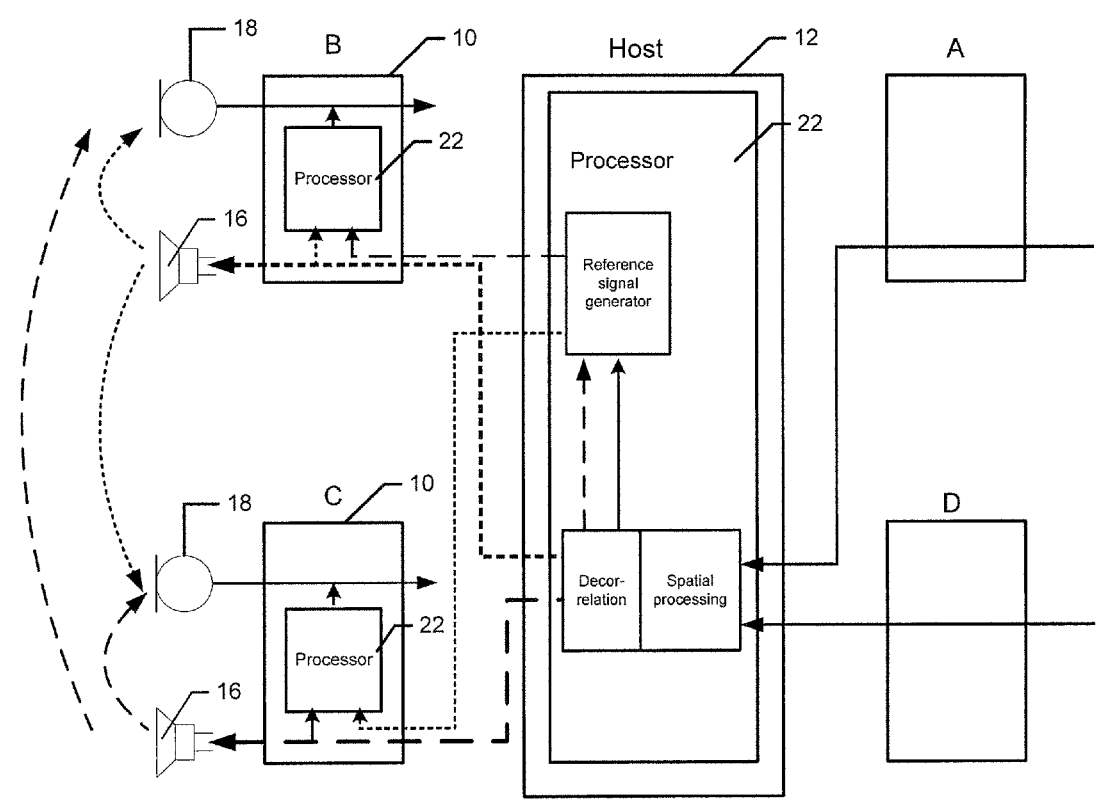
Figure 7:
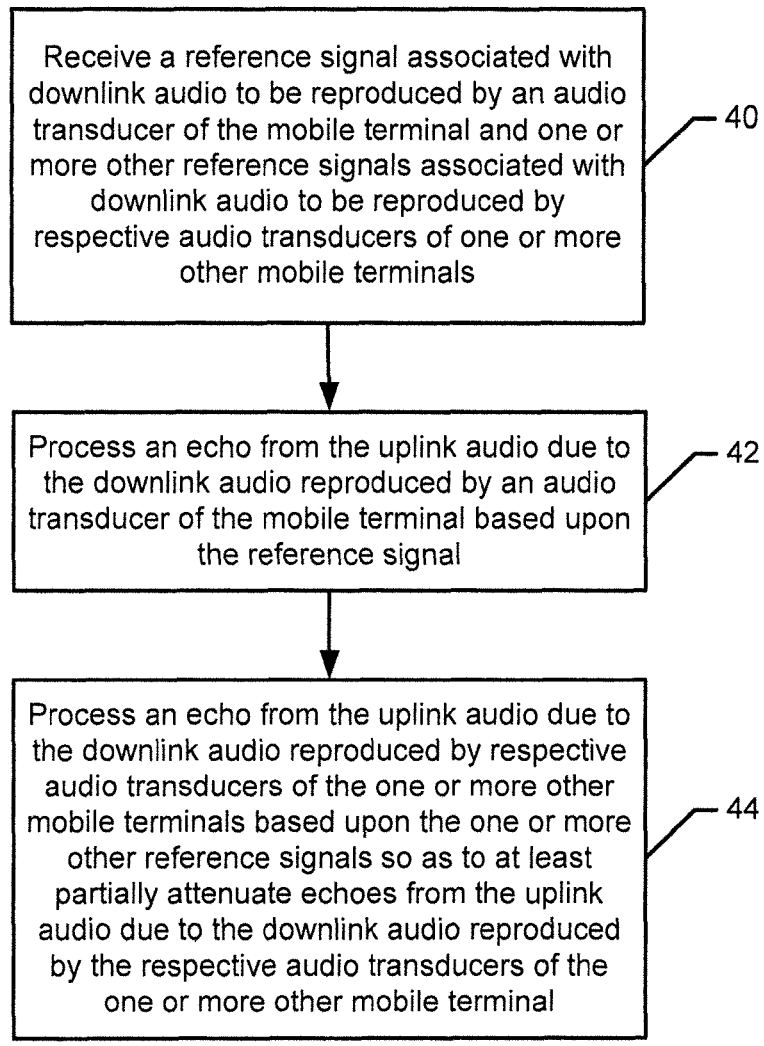

Having thus described certain example embodiments of the present invention in general terms, reference will hereinafter be made to the accompanying drawings, which are not necessarily drawn to scale, and wherein:

FIG. 1 is a schematic representation of a plurality of mobile terminals located within the same acoustical space and participating in a distributed voice conferencing session;

FIG. 2 is a schematic representation of a distributed voice conferencing system;

FIG. 3 is a block diagram illustrating the generation of an echo as a result of the spatialized audio processing of downlink signals;

FIG. 4 is a block diagram of an apparatus that may be embodied by a mobile terminal or by a host device and that may be specifically configured in accordance with an example embodiment of the present invention;

FIG. 5 is a flow chart of a system including a host device and a plurality of mobile terminals that may be specifically configured in accordance with an example embodiment of the present invention;

FIG. 6 is a block diagram illustrating the operations performed, such as by an apparatus of FIG. 4 embodied by a host device, in accordance with an example embodiment of the present invention; and FIG. 7 is a flow chart illustrating the operations performed, such as by an apparatus of FIG. 4 embodied by a mobile terminal, in accordance with an example embodiment of the present invention.

DETAILED DESCRIPTION

Some embodiments of the present invention will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present invention.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, and/or other computing device.

As defined herein, a "computer-readable storage medium," which refers to a non-transitory physical storage medium (e.g., volatile or non-volatile memory device), can be differentiated from a "computer-readable transmission medium," which refers to an electromagnetic signal.

A method, apparatus and computer program product are provided according to one embodiment in order to reduce or eliminate echo signals in a distributed voice conference session. In particular, the method, apparatus and computer program product of an example embodiment may reduce or eliminate echo signals that may otherwise occur as a result of spatial sound reproduction by the various mobile terminals that share the same acoustical space during a distributed voice conferencing session.

In this regard, distributed voice conferencing may be supported by a system of the type shown, for example, in FIG. 2 in which a central conference server 14 facilitates communications between mobile terminals 10 in various locations. In accordance with distributed voice conferencing, each or at least some of the participants may utilize mobile terminals and, more particularly, the audio transducers, e.g., microphones and loudspeakers, of their mobile terminals in order to receive and transmit audio signals during the distributed voice conference. In this regard, the mobile terminal may be a portable digital assistant (PDA), mobile telephone, smartphone, pager, mobile television, gaming device, laptop computer, camera, tablet computer, touch surface, video recorder, audio/video player, radio, electronic book, positioning device (e.g., global positioning system (GPS) device), or any combination of the aforementioned, and other types of voice and text communications systems.

By permitting each or at least some of the participants to utilize mobile terminals 10 during a distributed voice conferencing session, multiple participants and, as a result, multiple mobile terminals may be positioned within the same acoustical space, such as within the same room. See, for example, locations A and C in FIG. 2. A host device 12 may facilitate communication with the plurality of mobile terminals positioned within the same acoustical space. In this regard, the host device may receive audio signals from the mobile terminals and may mix the audio signals to generate an enhanced uplink signal that is provided to the central conference server 14 and/or to other participants. In the downlink direction, the host device may receive the audio signals from the network and may share the audio signals with one or more of the mobile terminals within the acoustical space. The host device may be embodied by one of the mobile terminals or other computing device within the acoustical space, as shown, for example, in location A of FIG. 2. As such, the host device may include a microphone and/or an audio transducer, e.g., a loudspeaker. Alternatively, the host device may be embodied by a network element, such as the central conference server, that separately communicates with each of the mobile terminals within an acoustical space, such as location C in FIG. 2.

In a distributed voice conferencing session, the mobile terminals 10 that are within the same acoustical space are determined, such as the mobile terminals at location A or the mobile terminals at location C. The determination of the mobile terminals within the same acoustical space may be performed during a set up procedure. In this regard, a distributed conferencing session may be set up in various manners. For example, the host device 12 may advertise the conference, such as via a local area network, e.g., a WiFi network using universal plug and play (uPnP) or other comparable protocol. The mobile terminals within the acoustical space may receive notice of the distributed conferencing session and may elect to join the distributed conferencing session in order to commence a connection setup process, such as a voice over internet protocol (VoIP) connection set up process. Alternatively, the mobile terminals within an acoustical space that are to participate in a distributed conferencing session may be determined by near field communication (NFC), such as by touching each mobile terminal to the host device. Still further, a mobile terminal may place a standard VoIP call to the host device and the host device may be configured to determine the mobile terminals that are located within the same acoustical space either by automatic recognition techniques or by information provided by the user of the mobile terminal, such as by DTMF signaling.

During the set up process of a distributed voice conferencing session, a mobile terminal 10 may transmit a connection request, along with spatial capability information, to the host device 12 in order to join a distributed conferencing session. The host device may, in turn, define the group to which the mobile terminal belongs, such as the group that includes the other mobile terminals within the same acoustical space. The host device may also determine the spatial reproduction capability of the group, such as based upon information provided by the mobile terminals. In an instance in which the group of mobile terminals, that is, the mobile terminals within the same acoustical space, has spatial playback capability, the host device may plan to utilize spatial sound reproduction with respect to the mobile terminals within the acoustical space. Conversely, if the group does not have spatial playback capability, the host device may utilize traditional monophonic distributed setup utilizing a mono mixer. In this regard, in an instance in which at least one of the mobile terminals of a group does not support spatial playback, the host device may set up traditional monophonic playback for the group. Alternatively, the mobile terminal that does not support playback may be configured such that the microphone signal from the respective mobile terminal is not utilized. Indeed, the user interface of the mobile terminal may provide an indication to the user indicating that the microphone has been muted. Thus, the mobile terminal that does not support spatial playback may reproduce spatial signals, but will not capture audio signals. In a session initiation protocol (SIP)/session description protocol (SDP) environment, the host device of this embodiment may limit the mobile terminal to the reproduction of a spatial signal without capturing audio signals by utilizing the receive only/send only functionality.

Thereafter, audio streams between the host device 12 and the mobile terminals 10 may be connected including stereo downlink streams from the host device to the mobile terminals in an instance in which the mobile terminals have spatial capability. Additionally, signals to and from other groups of mobile terminals, such as mobile terminals in other locations, that are to participate in the distributed conferencing session are also configured. Once set up, such as described above, a distributed conferencing session including spatial playback may be conducted by the host device between the plurality of mobile terminals.

An example embodiment of the invention will now be described with reference to FIG. 4, in which certain elements of an apparatus 20 for attenuating echo signals that may otherwise be created by spatial playback during a distributed conferencing session are depicted. The apparatus of FIG. 4 may be employed, for example, in conjunction with, such as by being incorporated into or embodied by, the host device 12 or by one or more of the mobile terminals 10 that participate in the distributed conferencing session.

It should also be noted that while FIG. 4 illustrates one example of a configuration of an apparatus 20 for attenuating echo signals that may otherwise be created by spatial playback during a distributed conferencing session, numerous other configurations may also be used to implement embodiments of the present invention. As such, in some embodiments, although devices or elements are shown as being in communication with each other, hereinafter such devices or elements should be considered to be capable of being embodied within the same device or element and thus, devices or elements shown in communication should be understood to alternatively be portions of the same device or element.

Referring now to FIG. 4, the apparatus 20 for attenuating echo signals that may otherwise be created by spatial playback during a distributed conferencing session may include or otherwise be in communication with a processor 22, a memory device 24, a communication interface 26 and optionally a user interface 28 (such as in instances in which the apparatus is embodied by a mobile terminal 10). In some embodiments, the processor (and/or co-processors or any other processing circuitry assisting or otherwise associated with the processor) may be in communication with the memory device via a bus for passing information among components of the apparatus. The memory device may be non-transitory and may include, for example, one or more volatile and/or non-volatile memories. In other words, for example, the memory device may be an electronic storage device (e.g., a computer readable storage medium) comprising gates configured to store data (e.g., bits) that may be retrievable by a machine (e.g., a computing device like the processor). The memory device may be configured to store information, data, content, applications, instructions, or the like for enabling the apparatus to carry out various functions in accordance with an example embodiment of the present invention. For example, the memory device could be configured to buffer input data for processing by the processor. Additionally or alternatively, the memory device could be configured to store instructions for execution by the processor.

As noted above, the apparatus 20 may be embodied by a computing device, such as a mobile terminal or a fixed computing device. However, in some embodiments, the apparatus may be embodied as a chip or chip set. In other words, the apparatus may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The apparatus may therefore, in some cases, be configured to implement an embodiment of the present invention on a single chip or as a single "system on a chip." As such, in some cases, a chip or chipset may constitute means for performing one or more operations for providing the functionalities described herein.

The processor 22 may be embodied in a number of different ways. For example, the processor may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor may include one or more processing cores configured to perform independently. A multi-core processor may enable multiprocessing within a single physical package. Additionally or alternatively, the processor may include one or more processors configured in tandem via the bus to enable independent execution of instructions, pipelining and/or multithreading.

In an example embodiment, the processor 22 may be configured to execute instructions stored in the memory device 24 or otherwise accessible to the processor. Alternatively or additionally, the processor may be configured to execute hard coded functionality. As such, whether configured by hardware or software methods, or by a combination thereof, the processor may represent an entity (e.g., physically embodied in circuitry) capable of performing operations according to an embodiment of the present invention while configured accordingly. Thus, for example, when the processor is embodied as an ASIC, FPGA or the like, the processor may be specifically configured hardware for conducting the operations described herein. Alternatively, as another example, when the processor is embodied as an executor of software instructions, the instructions may specifically configure the processor to perform the algorithms and/or operations described herein when the instructions are executed. However, in some cases, the processor may be a processor of a specific device (e.g., a mobile terminal or a fixed computing device) configured to employ an embodiment of the present invention by further configuration of the processor by instructions for performing the algorithms and/or operations described herein. The processor may include, among other things, a clock, an arithmetic logic unit (ALU) and logic gates configured to support operation of the processor.

Meanwhile, the communication interface 26 may be any means such as a device or circuitry embodied in either hardware or a combination of hardware and software that is configured to receive and/or transmit data from/to a network and/or any other device or module in communication with the apparatus 20, such as to facilitate communications between the host device 12 and the mobile terminals 10 during a distributed conferencing session. In this regard, the communication interface may include, for example, an antenna (or multiple antennas) and supporting hardware and/or software for enabling communications with a wireless communication network. Additionally or alternatively, the communication interface may include the circuitry for interacting with the antenna(s) to cause transmission of signals via the antenna(s) or to handle receipt of signals received via the antenna(s). In some environments, the communication interface may alternatively or also support wired communication. As such, for example, the communication interface may include a communication modem and/or other hardware/software for supporting communication via cable, digital subscriber line (DSL), universal serial bus (USB) or other mechanisms.

In some embodiments, such as in instances in which the apparatus 20 is embodied by a mobile terminal 10, the apparatus may include a user interface 28 that may, in turn, be in communication with the processor 22 to provide output to the user and, in some embodiments, to receive an indication of a user input. As such, the user interface may include a display and, in some embodiments, may also include a keyboard, a mouse, a joystick, a touch screen, touch areas, soft keys, one or more microphones, a speaker, or other input/output mechanisms. In one embodiment, the user interface includes the display upon which visual representation(s) of the audio characteristic(s) of the one or more audio files are presented. Alternatively or additionally, the processor may comprise user interface circuitry configured to control at least some functions of one or more user interface elements such as a display and, in some embodiments, a speaker, ringer, one or more microphones and/or the like. The processor and/or user interface circuitry comprising the processor may be configured to control one or more functions of one or more user interface elements through computer program instructions (e.g., software and/or firmware) stored on a memory accessible to the processor (e.g., memory device 24, and/or the like).

Referring now to FIG. 5, the operations performed, such as the apparatus 20 of FIG. 4 embodied by a host device 12, in accordance with an example embodiment are illustrated. As shown in block 30 and as described above, the apparatus may include means, such as the processor 22, the communications interface 26 or the like, for determining a plurality of mobile terminals that share the same acoustic space. The apparatus may also include means, such as the processor, the communications interface or the like, for generating downlink audio signals, such as spatialized downlink audio signals, to be provided to a plurality of mobile terminals 10 in conjunction with distributed voice conferencing. See block 32 of FIG. 5. As shown in FIG. 6, for example, the apparatus, such as the processor, may receive uplink audio signals from the mobile terminals of one or more participants in the distributed conferencing session, e.g., mobile terminals A and D, and may spatially process the uplink audio signals in order to generate the spatialized downlink audio signals to be provided to the mobile terminals within an acoustical space, e.g., mobile terminals B and C, so as to generate a corresponding audible output. The apparatus, such as the processor, may generate the spatialized downlink audio signals in various manners including filtering of the downlink audio signals to equalize and/or modify the amplitude and/or frequency dependent delay introduced between the downlink audio signals provided to the various mobile terminals. The apparatus, such as the processor and/or the communications interface, may provide different downlink audio signals to at least two of the mobile terminals and, in one embodiment, to each of the mobile terminals located within the same acoustical space in order to provide for spatialization.

In one embodiment, the apparatus 20 embodied by the host device 12 may also include means, such as the processor 22, the communications interface 26 or the like, for decorrelating the downlink audio signal to be provided to a respective mobile terminal 10 from the downlink audio signals to be provided to the other mobile terminals. See block 34 of FIG. 5, as well as the example embodiment of FIG. 6. In this manner, the downlink audio signal to be provided to a respective mobile terminal may be separated from the downlink audio signals to be provided to the other mobile terminals. The spatialized downlink audio signals, following the optional decorrelation, may then be provided to the mobile terminals within the acoustical space such that the mobile terminals may reproduce audio signals based upon the spatialized downlink audio signals. With reference to FIG. 6, for example, the uplink audio signals provided by mobile terminal A may be spatially processed by the processor and then provided as downlink audio signals to the audio transducer 16, e.g., loudspeaker, of mobile terminal B as shown by the line formed of short dashes. The uplink audio signals provided by mobile terminal A may also optionally be decorrelated, such as in an instance in which some energy of the uplink audio signals from mobile terminal A is also distributed to mobile terminal C, which would benefit from such decorrelation. As another example, the uplink audio signals provided by mobile terminal D of FIG. 6 may be spatially processed and decorrelated by the processor and then provided as downlink audio signals to the audio transducer of mobile terminal C as shown by the line formed of long dashes.

In order to reduce or eliminate acoustic echo signals from uplink audio captured by the microphones 18 of the mobile terminals 10 within the acoustical space that is due to the downlink audio reproduced by the audio transducers 16 of the mobile terminals, the mobile terminals may be provided with reference signals. These reference signals may include a reference signal embodied by or otherwise associated with the decorrelated downlink audio signal that has been provided to a respective mobile terminal and one or more other reference signals. In this regard, the apparatus 20 embodied by the host device 12 may also include means, such as the processor 22, the communications interface 26 or the like, for causing one or more reference signals, such as one or more other reference signals, to be provided to a respective mobile terminal. See block 36 of FIG. 5. At least some of the reference signals, e.g., the other reference signals, are associated with downlink audio to be reproduced by the audio transducers of one or more other mobile terminals. As shown, for example, by FIG. 6, the processor may include a reference signal generator for generating the one or more other reference signals. In this regard, the reference signal generator is configured to generate the other reference signals based on spatialized downlink signals. The reference signal generator may generate the other reference signals in any of various manners based upon processing or combining of the downlink signals.

The apparatus 20 embodied by the host device 12, such as the processor 22 and/or the communications interface 26, may multicast or broadcast the one or more reference signals to each of the mobile terminals 10. Alternatively, the apparatus embodied by the host device, such as the processor and/or the communications interface, may unicast the one or more reference signals separately to each mobile terminal. In one embodiment, the apparatus, such as the processor and/or the communications interface, may transmit a single stereo coded audio stream to each mobile terminal with one channel, e.g., the left channel, directed to the audio transducer 16 (and providing the reference signal associated with the decorrelated downlink audio signal that has been provided to the respective mobile terminal) and the other channel, e.g., the right channel, providing the other reference signal(s).

As described below, a mobile terminal 10, such as the processor 22 of the mobile terminal, may provide acoustic echo control and, as such, may incorporate one or more adaptive filters. The adaptive filtering algorithm may be embodied in various manners including, for example, normalized least means squars (NLMS) filtering or recursive least squares (RLS) filtering. In one embodiment, the processor of each mobile terminal may include a primary adaptive filter for receiving the decorrelated downlink audio signal that is reproduced by the audio transducer 16 of the mobile terminal to create an audible output, such that the decorrelated downlink audio signal also serves as the primary reference signal. The primary adaptive filter may then process the uplink audio, such as the audio signals received by the microphone 18 of the mobile terminal, so as to reduce or eliminate echo signals resulting from the audible output of the audio transducer based upon the decorrelated downlink audio signal, such as by subtracting a filtered representation of the decorrelated downlink audio signal from the audio signals received by the microphone. The processor may also include one or more additional adaptive filters that receive the one or more other reference signals provided by the host device 12. The processor, such as the one or more additional adaptive filters, may utilize the one or more other reference signals provided by the host device so as to process the uplink audio, such as the audio signals received by the microphone of the mobile terminal, in order to reduce or eliminate echo signals created by the audio output from the audio transducers of the other mobile terminals within the same acoustical space, such as by subtracting filtered representation(s) of the one or more additional reference signals from the audio signals received by the microphone. As such, the acoustic echo signal may be reduced or eliminated during a distributed conferencing session, even in an instance in which spatialized audio processing is utilized.

With reference to FIG. 6, for example, the host device 12 receives uplink audio signals provided by mobile terminal A and provides corresponding downlink audio signals to the audio transducer 16 of mobile terminal B as shown by the line formed of short dashes. As shown, the same downlink audio signals serve as the reference signal, that is, a primary reference signal, and are also provided to the primary adaptive filter of mobile terminal B in order to permit echo signals received by the microphone 18 of mobile terminal B in response to the audio output created by the audio transducer of mobile terminal B to be controlled such as by being attenuated. The host device also generates other reference signals based upon the downlink audio signals provided to mobile terminal B and provides the other reference signals to the other mobile terminals, such as mobile terminal C, as shown by the line formed of short dashes. As such, the additional adaptive filter of mobile terminal C may permit echo signals received by the microphone of mobile terminal C in response to the audio output created by the audio transducer of mobile terminal B to be controlled, such as by being at least partially attenuated. By way of another example shown by FIG. 6, the host device receives uplink audio signals provided by mobile terminal D and provides corresponding downlink audio signals to the audio transducer of mobile terminal C as shown by the line formed of long dashes. As shown, the same downlink audio signals serve as the primary reference signal and are also provided to the primary adaptive filter of mobile terminal C in order to permit echo signals received by the microphone of mobile terminal C in response to the audio output created by the audio transducer of mobile terminal C to be controlled, such as by being at least partially attenuated. The host device also generates other reference signals based upon the downlink audio signals provided to mobile terminal C and provides the other reference signals to the other mobile terminals, such as mobile terminal B, as shown by the line formed of long dashes. As such, the additional adaptive filter of mobile terminal B may permit echo signals received by the microphone of mobile terminal B in response to the audio output created by the audio transducer of mobile terminal C to be controlled, such as by being at least partially attenuated.

With reference now to FIG. 7, the operations performed by an apparatus 20 embodied by a mobile terminal 10 are also provided. In addition to receiving a downlink audio signal from the host device 12 and reproducing audio signals via the audio transducer 16 of the mobile terminal based upon the downlink audio signal, the apparatus embodied by the mobile terminal may include means, such as the processor 22, the communications interface 26 or the like, for receiving one or more reference signals. See block 40 of FIG. 7. As described above, the one or more reference signals may include a reference signal, that is, a primary reference signal, associated with the downlink audio to be reproduced by the audio transducer of the mobile terminal and one or more other reference signals associated with the downlink audio to be reproduced by the respective audio transducers of one or more other mobile terminals. In this regard, the primary reference signal may be formed by the downlink audio signal, such as the decorrelated downlink audio signal provided by the host device in order to generate audible output by the audio transducer of the mobile terminal. With respect to the primary reference signal, the processor may include an adaptive audio filter, such as a primary adaptive filter, for receiving and filtering the primary reference signal and then subtracting the filtered signal, e.g., the estimate of the echo signal, from the audio signals received by the microphone 18 of the mobile terminal. With respect to the one or more other reference signals, the processor may include an adaptive audio filter, such as one or more secondary adaptive filters, for receiving and filtering the other reference signal(s) and then subtracting the filtered signal(s) from the audio signals received by the microphone of the mobile terminal. In one embodiment, the processor includes a separate secondary adaptive filter for each other reference signal in order to appropriately process the audio signals received by the microphone in accordance with the respective other reference signal.

In response to the downlink audio signals, the mobile terminals 10 may reproduce downlink audio in the form of audible output from the audio transducers 16 of the various mobile terminals within the acoustical space. The microphones 18 of the mobile terminals may receive the audible output that is reproduced, both by the same mobile terminal and by the other mobile terminals within the acoustical space. As such, the apparatus 20 embodied by the mobile terminal may include means, such as the processor 22 or the like, for determining or processing an echo signal from uplink audio due to the downlink audio reproduced by an audio transducer of the mobile terminal based upon the reference signal. See block 42 of FIG. 7. In this regard, the processor, such as the primary adaptive filter, may process the echo by attenuating or otherwise adjusting the echo signals from uplink audio due to the downlink audio reproduced by the audio transducer of the mobile terminal and received by the microphone of the mobile terminal based upon the reference signal. Since the mobile terminals within the same acoustical space may generate different audible output based upon the spatial sound reproduction, the apparatus embodied by the mobile terminal may also include means, such as the processor or the like, for determining or processing an echo signal from uplink audio due to the downlink audio reproduced by respective audio transducers of the one or more other mobile terminals based upon the one or more other reference signals. See block 44. Thus, the processor, such as the secondary adaptive filter(s), may at least partially attenuate or otherwise adjust the echo signal from the uplink audio due to the downlink audio reproduced by the audio transducers of the other mobile terminals and received by the microphone of the respective mobile terminal based upon the other reference signal(s). As such, less, if any, echo signals are transmitted to the other mobile terminals on the far end of the distributed conferencing session. The echo signals from uplink audio due to the downlink audio reproduced by respective audio transducers of the plurality of mobile terminals may contain different signal characteristics since the mobile terminals have different audio transducers and processors and further since the mobile terminals have different relative positions.

The echo signals may be processed in various manners including attenuating the echo signal so as to reduce, adjust, remove, cancel, modify or eliminate the echo signal. In one embodiment, the echo signal may only be attenuated in an instance in which the echo signal satisfies a predefined threshold, such as by having a volume that equals or exceeds a predefined volume, with echo signals that fail to satisfy the predefined threshold being allowed. Although the other reference signals are described in one example embodiment to be utilized by the processor 22, such as the secondary adaptive filter(s), to process the audible signals captured by the microphone 18 to attenuate the echo signals from the uplink audio due to the downlink audio reproduced by the audio transducers 16 of the other mobile terminals, the apparatus, such as the processor, may be configured to process the audible signals captured by the microphone to cancel any signal identified or represented by the other reference signal.

The host device 12 may generate and the mobile terminals 10 may receive a variety of different other reference signals. In one embodiment, the one or more other reference signals provided by the host device, such as the reference signal generator, is a single other reference signal associated with the downlink audio to be reproduced by the respective audio transducers 16 of a plurality of other mobile terminals. Thus, the single other reference signal is based upon contributions from the downlink audio that may be reproduced by the audio transducer of each of a number of the other mobile terminals within the acoustical space.

In another embodiment, the host device 12 may generate and the mobile terminals 10 may receive a plurality of other reference signals including at least one first reference signal associated with a respective one of the other mobile terminals. For example, the host device may determine the other mobile terminal that is closest to the respective mobile terminal and which would therefore likely generate audible output that would create the largest echo signal for the mobile terminal. In this embodiment, a host device may generate and the mobile terminal may receive a first reference signal that is based upon the audible output to be reproduced by the closest one of the other mobile terminals. In this embodiment, the one or more other reference signals may also include a second reference signal associated with the downlink audio to be reproduced by respective audio transducers of a plurality of the other mobile terminals. Thus, for each of the other mobile terminals for which a first reference signal is not provided, a second reference signal may be provided that includes contributions based upon the audio signals to be reproduced by the respective audio transducers of each of the other mobile terminals, such as the mobile terminals located at a greater distance to the respective mobile terminal. While a single first reference signal is described in the foregoing embodiment, the host device may generate two or more first reference signals, each of which is associated with a respective one of the other mobile terminals with the contributions to the audible output reproduced by the respective audio transducers of all of the other mobile terminals being addressed by a single second reference signal.

In a further embodiment, the one or more other reference signals may include a plurality of different reference signals with each other reference signal associated with a respective one of the other mobile terminals 10. Thus, a different reference signal may be provided in conjunction with the audible output produced by the audio transducer of the each of the other mobile terminals.

In yet another embodiment, the primary reference signal and the one or more other reference signals may be combined into a single reference signal, such as a mono sum of all reference signals. In this embodiment, the mobile terminal 10, such as the processor 22, may initially reduce the single reference signal that is received from the host device 12 by the downlink audio signal that is directed to the audio transducer 16 of the mobile terminal to create the additional reference signal. As such, the processor, such as the primary and secondary adaptive filters, may separately process the echo signal based upon a reference signal formed by downlink audio signal and the other reference signal created above.

As described above, FIGS. 5 and 7 illustrate flowcharts of an apparatus 20, method, and computer program product according to example embodiments of the invention. It will be understood that each block of the flowcharts, and combinations of blocks in the flowcharts, may be implemented by various means, such as hardware, firmware, processor, circuitry, and/or other devices associated with execution of software including one or more computer program instructions. For example, one or more of the procedures described above may be embodied by computer program instructions. In this regard, the computer program instructions which embody the procedures described above may be stored by a memory device 24 of an apparatus employing an embodiment of the present invention and executed by a processor 22 of the apparatus. As will be appreciated, any such computer program instructions may be loaded onto a computer or other programmable apparatus (e.g., hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks. The computer program product may be embodied as an application, e.g., an app, that is configured to implement, for example, at least certain ones of the operations of the flowcharts of FIGS. 5 and 7.

Accordingly, blocks of the flowcharts support combinations of means for performing the specified functions and combinations of operations for performing the specified functions for performing the specified functions. It will also be understood that one or more blocks of the flowcharts, and combinations of blocks in the flowcharts, can be implemented by special purpose hardware-based computer systems which perform the specified functions, or combinations of special purpose hardware and computer instructions.

In some embodiments, certain ones of the operations above may be modified or further amplified. Furthermore, in some embodiments, additional optional operations may be included, such as illustrated by the blocks having a dashed outline in FIG. 5. Modifications, additions, or amplifications to the operations above may be performed in any order and in any combination.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A method for a voice communication system, the method comprising:

receiving, at a mobile terminal, a reference signal associated with downlink audio to be reproduced by an audio transducer of the mobile terminal and one or more other reference signals associated with downlink audio to be reproduced by respective audio transducers of one or more other mobile terminals;

processing, with a processor, an echo signal from uplink audio due to the downlink audio reproduced by the audio transducer of the mobile terminal based upon the reference signal; and processing an echo signal from uplink audio due to the downlink audio reproduced by the respective audio transducers of the one or more other mobile terminals based upon the one or more other reference signals so as to at least partially attenuate echo signals from the uplink audio due to the downlink audio reproduced by the respective audio transducers of the one or more other mobile terminals.

2. A method according to claim 1 wherein the one or more other reference signals comprise a single other reference signal associated with the downlink audio to be reproduced by the audio transducers of each of the one or more other mobile terminals.

3. A method according to claim 1 wherein the one or more other reference signals comprise at least one first reference signal associated with the downlink audio to be reproduced by the audio transducer of a respective one of the one or more other mobile terminals.

4. A method according to claim 3 wherein the one or more other reference signals further comprise a second reference signal associated with the downlink audio to be reproduced by the audio transducers of a plurality of the other mobile terminals.

5. A method according to claim 1 wherein the one or more other reference signals comprise a plurality of other reference signals with each other reference signal associated with the downlink audio to be reproduced by the audio transducer of a respective one of the one or more other mobile terminals.

6. An apparatus for a voice communication system, the apparatus comprising:

at least one processor and at least one memory including computer program code, the at least one memory and the computer program code configured to, with the processor, cause the apparatus to at least:

receive, at a mobile terminal, a reference signal associated with downlink audio to be reproduced by an audio transducer of the mobile terminal and one or more other reference signals associated with downlink audio to be reproduced by respective audio transducers of one or more other mobile terminals;

process an echo signal from uplink audio due to the downlink audio reproduced by the audio transducer of the mobile terminal based upon the reference signal; and process an echo signal from uplink audio due to the downlink audio reproduced by the respective audio transducers of the one or more other mobile terminals based upon the one or more other reference signals so as to at least partially attenuate echo signals from the uplink audio due to the downlink audio reproduced by the respective audio transducers of the one or more other mobile terminals.

7. An apparatus according to claim 6 wherein the one or more other reference signals comprise a single other reference signal associated with the downlink audio to be reproduced by the audio transducers of each of the one or more other mobile terminals.

8. An apparatus according to claim 6 wherein the one or more other reference signals comprise at least one first reference signal associated with the downlink audio to be reproduced by the audio transducer of a respective one of the one or more other mobile terminals.

9. An apparatus according to claim 8 wherein the one or more other reference signals further comprise a second reference signal associated with the downlink audio to be reproduced by the audio transducers of a plurality of the other mobile terminals.

10. An apparatus according to claim 6 wherein the one or more other reference signals comprise a plurality of other reference signals with each other reference signal associated with the downlink audio to be reproduced by the audio transducer of a respective one of the one or more other mobile terminals.

11. A method for a voice communication system, the method comprising:

generating, with a processor, downlink audio signals to be provided to a plurality of mobile terminals in conjunction with distributed voice conferencing; and causing a reference signal and one or more other reference signals to be provided to a respective mobile terminal with the reference signal associated with the downlink audio signals provided to the respective mobile terminal and the one or more other reference signals associated with the downlink audio signals provided to one or more other mobile terminals to permit acoustic echo control of uplink audio due to downlink audio reproduced by respective audio transducers of the one or more other mobile terminals.

12. A method according to claim 11 further comprising decorrelating the downlink audio signal to be provided to the respective mobile terminal from the downlink audio signals to be provided to the one or more other mobile terminals.

13. A method according to claim 11 wherein the one or more other reference signals comprise at least one first reference signal associated with the downlink audio signals provided to a respective one of the one or more other mobile terminals.

14. A method according to claim 13 wherein the one or more other reference signals further comprise a second reference signal associated with the downlink audio signals provided to a plurality of the one or more other mobile terminals.

15. A method according to claim 11 wherein the one or more other reference signals comprise a plurality of other reference signals with each other reference signal associated with the downlink audio signals provided to a respective one of the one or more other mobile terminals.

16. A method according to claim 11 further comprising determining a plurality of mobile terminals including the respective mobile terminal and the one or more other mobile terminals that share a same acoustic space.

17. A method according to claim 11 wherein generating downlink audio signals comprises generating at least two different downlink audio signals to be provided to respective ones of the plurality of mobile terminals.

18. An apparatus for a voice communication system, the apparatus comprising:

at least one processor and at least one memory including computer program code, the at least one memory and the computer program code configured to, with the processor, cause the apparatus to at least:

generate downlink audio signals to be provided to a plurality of mobile terminals in conjunction with distributed voice conferencing; and cause a reference signal and one or more other reference signals to be provided to a respective mobile terminal with the reference signal associated with the downlink audio signals provided to the respective mobile terminal and the one or more other reference signals associated with the downlink audio signals provided to one or more other mobile terminals to permit acoustic echo control of uplink audio due to downlink audio reproduced by respective audio transducers of the one or more other mobile terminals.

19. An apparatus according to claim 18 further comprising decorrelating the downlink audio signal to be provided to the respective mobile terminal from the downlink audio signals to be provided to the one or more other mobile terminals.

20. An apparatus according to claim 18 wherein the one or more other reference signals comprise at least one first reference signal associated with the downlink audio signals provided to a respective one of the one or more other mobile terminals.

21. An apparatus according to claim 20 wherein the one or more other reference signals further comprise a second reference signal associated with the downlink audio signals provided to a plurality of the one or more other mobile terminals.

22. An apparatus according to claim 18 wherein the one or more other reference signals comprise a plurality of other reference signals with each other reference signal associated with the downlink audio signals provided to a respective one of the one or more other mobile terminals.

23. An apparatus according to claim 18 wherein the at least one memory and the computer program code are further configured to, with the processor, cause the apparatus to determine a plurality of mobile terminals including the respective mobile terminal and the one or more other mobile terminals that share a same acoustic space.

24. An apparatus according to claim 18 wherein the at least one memory and the computer program code are further configured to, with the processor, cause the apparatus to generate downlink audio signals by generating at least two different downlink audio signals to be provided to respective ones of the plurality of mobile terminals.

* * * * *